United States Patent
Wang et al.

(10) Patent No.: US 9,718,703 B2
(45) Date of Patent: Aug. 1, 2017

(54) APPARATUS AND METHOD FOR CONTINUOUSLY REMOVING OILY POLLUTANT FROM POLLUTED WATER USING HYDROPHOBIC/OLEOPHILIC ABSORBENT ARTICLE

(71) Applicant: I SHOU UNIVERSITY, Kaohsiung (TW)

(72) Inventors: Chih-Feng Wang, Kaohsiung (TW); Sheng-Jhih Lin, Kaohsiung (TW)

(73) Assignee: I SHOU UNIVERSITY, Kaohsiung (TW)

( * ) Notice: Subject to any disclaimer, the term of this patent is extended or adjusted under 35 U.S.C. 154(b) by 365 days.

(21) Appl. No.: 14/482,044

(22) Filed: Sep. 10, 2014

(65) Prior Publication Data

US 2016/0069035 A1  Mar. 10, 2016

(51) Int. Cl.
| | | |
|---|---|---|
| *E02B 15/10* | (2006.01) | |
| *C02F 1/28* | (2006.01) | |
| *B01J 20/32* | (2006.01) | |
| *B01J 20/28* | (2006.01) | |
| *C02F 101/32* | (2006.01) | |
| *C02F 103/00* | (2006.01) | |
| *B01J 20/20* | (2006.01) | |
| *C02F 1/40* | (2006.01) | |

(52) U.S. Cl.
CPC ........... *C02F 1/285* (2013.01); *B01J 20/2805* (2013.01); *B01J 20/3212* (2013.01); *B01J 20/3272* (2013.01); *E02B 15/106* (2013.01); *B01J 20/205* (2013.01); *C02F 1/288* (2013.01); *C02F 1/40* (2013.01); *C02F 2101/32* (2013.01); *C02F 2103/007* (2013.01)

(58) Field of Classification Search
CPC ...... C02F 1/285; C02F 1/288; C02F 2101/32; C02F 1/40; C02F 2103/007; E02B 15/10; E02B 15/106; B01D 39/1676; B01J 20/205; B01J 20/2805; B01J 20/3212; B01J 20/3272
USPC ....................... 210/460, 502.1, 693, 923, 924
See application file for complete search history.

(56) References Cited

U.S. PATENT DOCUMENTS 3,669,275 A * 6/1972 Downs .................... E02B 15/10
  210/242.4
2015/0321925 A1* 11/2015 Rubertelli ................. C02F 1/44
  210/636

OTHER PUBLICATIONS

Zhu et al, Robust superhydrophilic polyurethane sponge as a highly reusable oil-absorption material, Mar. 2013, Journal of Materials Chemistry A, vol. 1, pp. 5386-5393.*

(Continued)

*Primary Examiner* — Matthew O Savage
(74) *Attorney, Agent, or Firm* — Steptoe & Johnson LLP

(57) ABSTRACT

An apparatus for continuously removing an oily pollutant from polluted water includes an absorbent unit and a suctioning unit. The absorbent unit is made of a hydrophobic and oleophilic porous material and is able to absorb and to separate the oily pollutant from water when the absorbent unit is placed in the polluted water. The suctioning unit is coupled to the absorbent unit and is operable for providing a suctioning force to the absorbent unit so as to continuously remove the oily pollutant absorbed by the absorbent unit. A method for continuously removing the oily pollutant from the polluted water is also provided.

16 Claims, 3 Drawing Sheets

(56) References Cited

OTHER PUBLICATIONS

Wang et al, Robust superhydrophobic/superoleophilic sponge for effective continuous absorption and expulsion of oil pollutants from water, Sep. 2013, Applied Materials and Interfaces, vol. 5, pp. 8861-8864.*

* cited by examiner

APPARATUS AND METHOD FOR CONTINUOUSLY REMOVING OILY POLLUTANT FROM POLLUTED WATER USING HYDROPHOBIC/OLEOPHILIC ABSORBENT ARTICLE

FIELD OF THE INVENTION

The invention relates to an apparatus and a method for removing oily pollutant from polluted water, more particularly to an apparatus and a method for continuously removing the oily pollutant from the polluted water using a hydrophobic/oleophilic absorbent article.

BACKGROUND OF THE INVENTION

With the expansion of oil production and transportation, there is increasing potential for oil spills from industrial accidents or sinking of oil tankers or ships. Conventional methods for removing oily pollutant from polluted water may include burning the oily pollutant, or using oil skimmers or oil absorbent material to collect (or to absorb) the oily pollutant. The conventional oil absorbent material, such as zeolites, kapok, activated carbons, silicas, organophilic clays, and synthetic polymer, is capable of absorbing the oily pollutant owing to the intrinsic absorption property thereof. However, the conventional oil absorbent material may suffer from some drawbacks such as relatively low absorption speed and relatively low oil-water selectivity. In addition, it is necessary to remove the absorbed oily pollutant from the conventional oil absorbent material by burning, by mechanical squeezing, or by solvent washing, which results in relatively high cost and relatively low efficiency for removal of the oily pollutant, and which renders the conventional oil absorbent material unable to be used for continuous removal of the oily pollutant from the polluted water.

SUMMARY OF THE INVENTION

Therefore, the object of the present invention is to provide an apparatus as well as a method that may alleviate at least one of the aforementioned drawbacks associated with the prior art.

According one aspect of the present invention, an apparatus for continuously removing an oily pollutant from polluted water includes an absorbent unit and a suctioning unit. The absorbent unit is made of a hydrophobic and oleophilic porous material and is able to absorb and to separate the oily pollutant from water when the absorbent unit is placed in the polluted water. The suctioning unit is operable for providing a suctioning force to the absorbent unit so as to continuously remove the oily pollutant absorbed by the absorbed unit.

According to another aspect of the present invention, a method for continuously removing an oily pollutant from polluted water includes the following steps of:

(a) placing an absorbent unit into the polluted water to absorb and to separate the oily pollutant from water, the absorbent unit being made of a porous material that has hydrophobic and oleophilic properties; and (b) removing the oily pollutant from the absorbent unit by suctioning the oily pollutant, which is absorbed by the absorbent unit, through the suctioning unit.

According to still another aspect of the present invention, a hydrophobic and oleophilic absorbent article comprises: an oleophilic elastomeric sponge body made of polyurethane; and a hydrophobic coating deposited onto the oleophilic elastomeric sponge body and including polydimethylsiloxane and carbon nano-tubes.

The applicants of the present invention described a method for separation of oily pollutants from water, and a superhydrophobic/superoleophilic absorbent in Wang et al., "Robust Superhydrophobic/superoleophilic sponge for Effective Continuous Absorption and Expulsion of Oil Pollutants from Water", Applied Material & Interfaces 2013, 5, 8861-886. The disclosure in the aforesaid article is incorporated herein by reference.

BRIEF DESCRIPTION OF THE DRAWINGS

Other features and advantages of the present invention will become apparent in the following detailed description of the exemplary embodiment with reference to the accompanying drawings, of which.

DETAILED DESCRIPTION OF THE EXEMPLARY EMBODIMENTS

Referring to FIGS. 1 and 2a to 2c, the exemplary embodiment of the apparatus for continuously removing an oily pollutant (A) from polluted water (D) (see FIGS. 2a to 2c) according to the present invention is shown to include a suctioning unit 1 and an absorbent unit 2.

Figure 2:
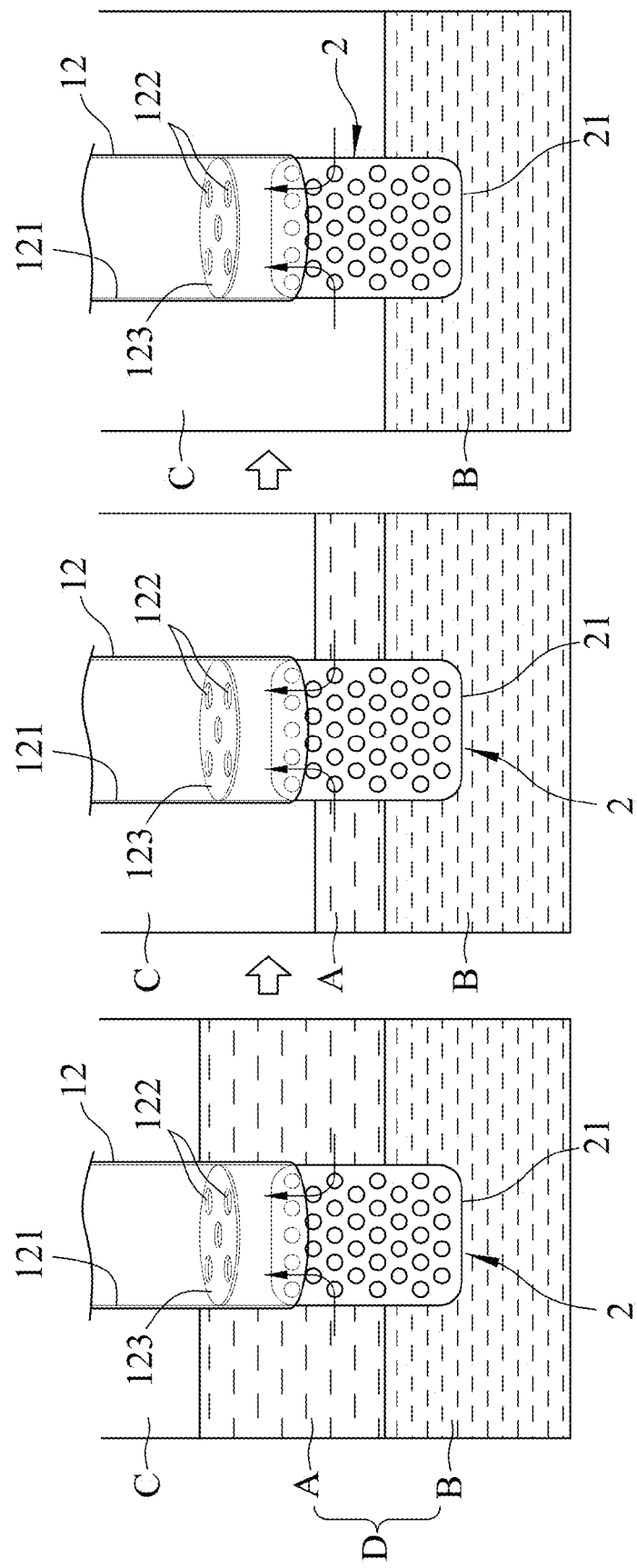
FIGS. 2a to 2c are schematic diagrams illustrating how the oily pollutant is continuously absorbed by an absorbent unit of the exemplary embodiment of the apparatus from a surface of the polluted water.

The absorbent unit 2 is made of a hydrophobic and oleophilic porous material and is able to absorb and to separate the oily pollutant (A) from a surface of the polluted water (D) when the absorbent unit 2 is placed in the polluted water (D) (see FIG. 2a). The absorbent unit 2 includes an elastomeric sponge body coated with a coating. In this embodiment, the absorbent unit 2 is super-hydrophobic and super-oleophilic and is configured to have an oleophilic elastomeric sponge body 21 that is made of polyurethane (see FIG. 2a), and a hydrophobic coating that is deposited onto the sponge body 21 and that includes polydimethylsiloxane (PDMS) and carbon nanotubes (CNTs). Preferably, the absorbent unit 2 has a water contact angle that is not less than 140° and a sliding angle is smaller than or about 5°. More preferably, the water contact angle of the absorbent unit 2 is not less than 160°.

The suctioning unit 1 is coupled to the absorbent unit 2 and is operable for providing a suctioning force to the absorbent unit 2 so as to continuously remove the oily pollutant (A) absorbed by the absorbent unit 2. In this embodiment, the suctioning unit 1 includes a vacuum suctioning device 11 operable to provide the suctioning force, and a suctioning tube 12 that extends from the vacuum suctioning device 11 and that has a tubular body 121 provided with a suctioning end. When assembling the apparatus of this embodiment, the elastomeric sponge body 21 of the absorbent unit 2 is partially inserted into the suctioning end of the tubular body 121 and protrudes partially and outwardly from the suctioning end.

Figure 1:
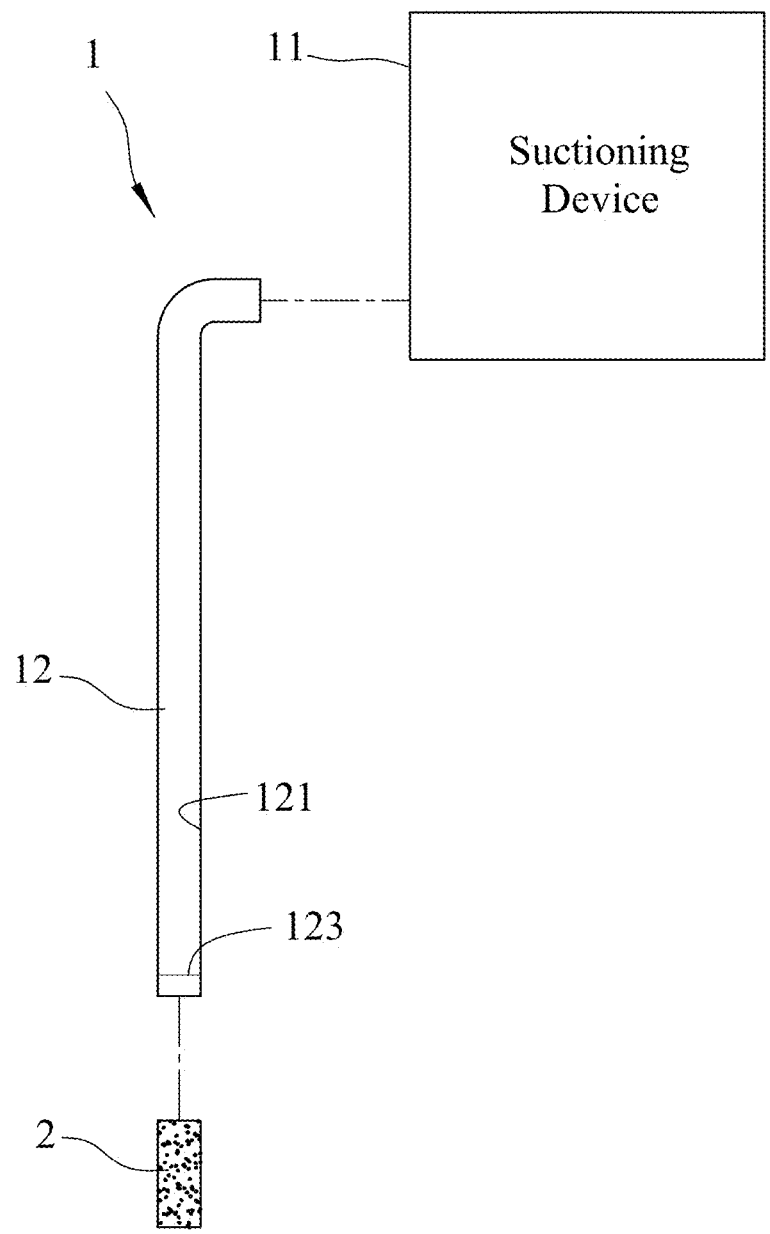
FIG. 1 is a schematic exploded view of the exemplary embodiment of an apparatus for continuously removing an oily pollutant from polluted water according to the present invention.

It should be noted that, in this embodiment, the suctioning tube 12 further has a retention member 123 that is disposed transversely in the tubular body 121 in proximity to the suctioning end to prevent the elastomeric sponge body of the absorbent unit 2 from being drawn inwardly from the suctioning end by the suctioning force that is provided by the vacuum suctioning device 11 (see FIG. 1). As shown in FIGS. 2a to 2c, the retention member 123 is configured as a perforated plate that is formed with a plurality of through holes 122 configured to allow passage of the oily pollutant (A) from the elastomeric sponge body 21 to the vacuum suctioning device 11. However, it should be noted that the configuration of the retention member 123 may vary in other embodiments of the present invention and is not limited to what is disclosed in this exemplary embodiment.

It is worth noting that, the absorbent unit 2 may be produced by a dip-coating method. An example of the absorbent unit 2 of this embodiment is prepared as follows:

200 mg of polydimethylsiloxane (PDMS) was dissolved in 200 mg of ethyl acetate (EtOAc), followed by adding 200 mg of carbon nanotubes thereto to form a CNT/PDMS suspension. The CNT/PDMS suspension was subjected to sonicating agitation for 20 minutes before 20 mg of a curing agent was added into the CNT/PDMS suspension. Meanwhile, a polyurethane sponge was cleaned ultrasonically in hexane and ethanol successively and then dried in an oven at 60° C. for two hours. The polyurethane sponge was then dipped into a CNT/PDMS suspension using a dip-coater (manufactured by Super Solutions & Services), so as to form a coating, which contains PDMS and CNTs, onto the polyurethane sponge. A curing process was then conducted in an oven at 120° C. for 6 hours to obtain the absorbent unit according to the present invention. A contact angle and a sliding angle of a water droplet (5 μl) on the absorbent unit 2 were measured using a contact angle goniometer (FDSA Magic Droplet-100) and are 162° and about 4°, respectively. The absorbent unit as prepared is superhydrophobic and superoleophilic.

Figure 3:
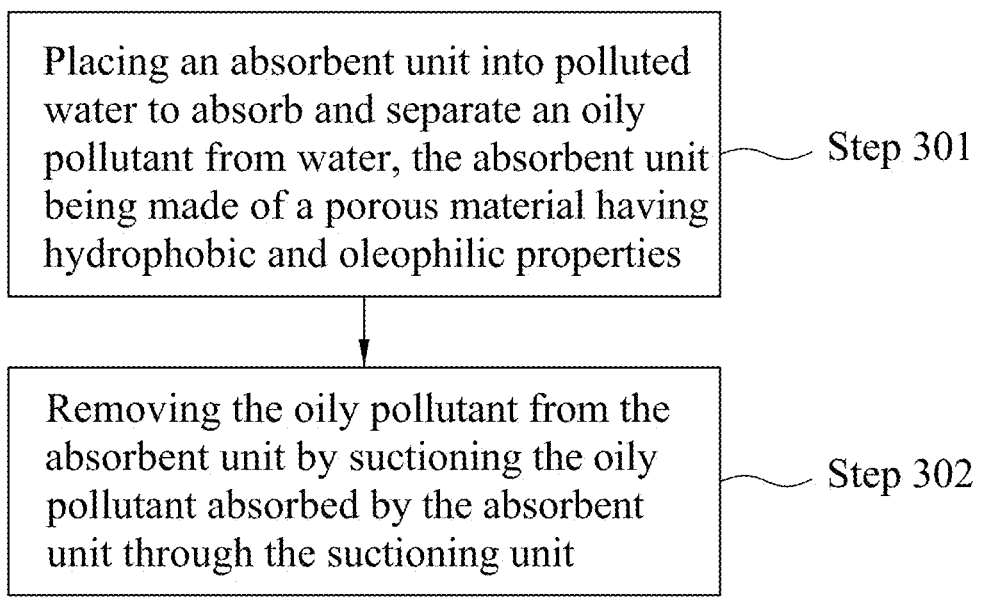
FIG. 3 is a flow chart illustrating steps of the exemplary embodiment of a method for continuously removing an oily pollutant from polluted water according to the present invention.

As shown in FIGS. 2a to 2c and further referring to FIG. 3, the method for continuously removing the oily pollutant (A) from polluted water (D) includes the following steps:

Step 301: placing the absorbent unit 2 into the polluted water (D) to absorb and to separate the oily pollutant (A) from water (B). As shown in FIGS. 2a and 2b, since the absorbent unit 2 exhibits super-hydrophobic and super-oleophilic characteristics due to the porous structure of the elastomeric sponge body 21 and the nano-scale structure of the PDMS/CNTs coating, when the absorbent unit 2 is placed into the polluted water (D), only the oily pollutant (A) is absorbed by the absorbent unit 2 and the water (B) is expulsed by the absorbent unit 2, thereby separating the oily pollutant (A) from the water (B).

Step 302: removing the oily pollutant (A) from the absorbent unit 2 by suctioning the oily pollutant (A) absorbed by the absorbent unit 2 through the suctioning unit 1. As shown in FIG. 2a, by the suctioning force, the oily pollutant (A) is suctioned through the suctioning tube 12 via the through holes 122 of the retention member 123 to the suctioning device 11 and is collected at the suctioning device 11. It is worth noting that, as shown in FIG. 2c, when the oily pollutant (A) is completely removed from the polluted water (D) by the absorbent unit 2, instead of suctioning the water (B), air (C) may be absorbed and suctioned by the absorbent unit 2 and the suctioning unit 1. This is because it is easier for air to enter the absorbent unit than water owing to the super-hydrophobicity of the absorbent unit 2.

To sum up, by virtue of the super-hydrophobic and super-oleophilic characteristics of the absorbent unit 2 in combination with the suctioning force provided by the suctioning unit 1, the apparatus and the method of the present invention allow continuous removal of an oily pollutant from polluted water. Furthermore, the oily pollutant removal process can be conducted with relatively high efficiency and at a relatively low cost.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An apparatus for continuously removing an oily pollutant from polluted water, comprising:
    an absorbent unit that is made of a hydrophobic and oleophilic porous material, and that is able to absorb and separate the oily pollutant from water when said absorbent unit is placed in the polluted water; and
    a suctioning unit that is coupled to said absorbent unit and that is operable for providing a suctioning force to said absorbent unit so as to continuously remove the oily pollutant absorbed by said absorbent unit,
    wherein said absorbent unit includes an elastomeric sponge body coated with a coating and has a water contact angle that is greater than 100°, said elastomeric sponge body being a polyurethane sponge, said coating including polydimethylsiloxane and carbon nanotubes.

2. The apparatus according to claim 1, wherein said absorbent unit has a water contact angle that is not less than 160°.

3. The apparatus according to claim 1, wherein said suctioning unit includes a vacuum suctioning device operable to provide the suctioning force, and a suctioning tube that extends from said vacuum suctioning device and that has a suctioning end, said elastomeric sponge body being inserted into said suctioning end.

4. The apparatus according to claim 3, wherein said elastomeric sponge body is inserted partially into said suctioning end and protrudes partially and outwardly from said suctioning end.

5. The apparatus according to claim 3, wherein said suctioning tube has a retention member disposed transversely in said suctioning tube in proximity to said suctioning end to prevent said elastomeric sponge body from being drawn inwardly from said suctioning end by the suctioning force.

6. The apparatus according to claim 5, wherein said retention member is configured as a perforated plate that is formed with a plurality of through holes configured to allow passage of the oily pollutant from said elastomeric sponge body to said vacuum suctioning device.

7. A method for continuously removing an oily pollutant from polluted water, comprising the following steps of:
    fabricating an absorbent unit by depositing a hydrophobic coating onto an oleophilic elastomeric sponge body;
    placing the absorbent unit into polluted water to absorb and separate the oily pollutant from water, the absorbent unit being made of a porous material having hydrophobic and oleophilic properties; and removing the oily pollutant from the absorbent unit by suctioning the oily pollutant absorbed by the absorbent unit through the suctioning unit;

wherein the elastomeric sponge body is a polyurethane sponge and the hydrophobic coating includes polydimethylsiloxane and carbon nanotubes.

8. The method of claim 7, wherein the hydrophobic coating is deposited onto the oleophilic elastomeric sponge body by dip coating.

9. The method of claim 7, wherein the suctioning unit includes a vacuum suctioning device that is operable to provide a suctioning force, and a suctioning tube that extends from the vacuum suctioning device and that has a suctioning end, and wherein the absorbent unit is connected to the suctioning unit by inserting the oleophilic elastomeric sponge body into the suctioning end.

10. The method of claim 9, wherein the oleophilic elastomeric sponge body is partially inserted into the suctioning end and protrudes partially and outwardly from the suctioning end.

11. The method of claim 9, wherein the suctioning tube has a retention member disposed transversely in the suctioning tube in proximity to the suctioning end to prevent the oleophilic elastomeric sponge body from being drawn inwardly from the suctioning end by the suctioning force.

12. The method of claim 11, wherein the retention member is configured as a perforated plate that is formed with a plurality of through holes to allow passage of the oily pollutant from the absorbent unit to the vacuum suctioning device.

13. A hydrophobic and oleophilic absorbent, comprising:
an elastomeric sponge body made of polyurethane; and
a coating deposited onto said elastomeric sponge body and including polydimethylsiloxane and carbon nanotubes.

14. The absorbent according to claim 13, having a water contact angle that is not less than 160°.

15. An apparatus for continuously removing an oily pollutant from polluted water, comprising:
an absorbent unit that is made of a hydrophobic and oleophilic porous material, and that is able to absorb and separate the oily pollutant from water when said absorbent unit is placed in the polluted water; and
a suctioning unit that is coupled to said absorbent unit and that is operable for providing a suctioning force to said absorbent unit so as to continuously remove the oily pollutant absorbed by said absorbent unit;

wherein said absorbent unit includes an elastomeric sponge body coated with a coating, and has a water contact angle that is greater than 100°;

wherein said suctioning unit includes a vacuum suctioning device operable to provide the suctioning force, and a suctioning tube that extends from said vacuum suctioning device and that has a suctioning end, said elastomeric sponge body being inserted into said suctioning end;

wherein said suctioning tube has a retention member disposed transversely in said suctioning tube in proximity to said suctioning end to prevent said elastomeric sponge body from being drawn inwardly from said suctioning end by the suctioning force; and wherein said retention member is configured as a perforated plate that is formed with a plurality of through holes configured to allow passage of the oily pollutant from said elastomeric sponge body to said vacuum suctioning device.

16. A method for continuously removing an oily pollutant from polluted water, comprising the following steps of:
fabricating an absorbent unit by depositing a hydrophobic coating onto an oleophilic elastomeric sponge body;
placing the absorbent unit into polluted water to absorb and separate the oily pollutant from water, the absorbent unit being made of a porous material having hydrophobic and oleophilic properties; and
removing the oily pollutant from the absorbent unit by suctioning the oily pollutant absorbed by the absorbent unit through the suctioning unit;

wherein the suctioning unit includes a vacuum suctioning device that is operable to provide a suctioning force, and a suctioning tube that extends from the vacuum suctioning device and that has a suctioning end, and wherein the absorbent unit is connected to the suctioning unit by inserting the oleophilic elastomeric sponge body into the suctioning end;

wherein the suctioning tube has a retention member disposed transversely in the suctioning tube in proximity to the suctioning end to prevent the oleophilic elastomeric sponge body from being drawn inwardly from the suctioning end by the suctioning force; and wherein the retention member is configured as a perforated plate that is formed with a plurality of through holes to allow passage of the oily pollutant from the absorbent unit to the vacuum suctioning device.

\* \* \* \* \*